United States Patent
Navarro-Sorroche et al.

(10) Patent No.: US 10,438,713 B2
(45) Date of Patent: Oct. 8, 2019

(54) HIGH OUTPUT ACCELERATOR NEUTRON SOURCE

(71) Applicant: Halliburton Energy Services, Inc., Houston, TX (US)

(72) Inventors: Juan Navarro-Sorroche, Plano, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 154 days.

(21) Appl. No.: 15/326,167

(22) PCT Filed: Nov. 16, 2015

(86) PCT No.: PCT/US2015/060829
§ 371 (c)(1),
(2) Date: Jan. 13, 2017

(87) PCT Pub. No.: WO2017/086910
PCT Pub. Date: May 26, 2017

(65) Prior Publication Data
US 2017/0271037 A1    Sep. 21, 2017

(51) Int. Cl.
*G21G 4/02* (2006.01)
*H05H 3/06* (2006.01)
*G21B 3/00* (2006.01)

(52) U.S. Cl.
CPC ............... *G21G 4/02* (2013.01); *H05H 3/06* (2013.01); *G21B 3/006* (2013.01)

(58) Field of Classification Search
CPC ............... H05H 3/06; G21G 4/02; G21B 1/05
See application file for complete search history.

(56) References Cited

U.S. PATENT DOCUMENTS

| | | | |
|---|---|---|---|
| 3,530,497 A | * | 9/1970 | Hirsch ............. G21B 1/05 376/107 |
| 3,657,539 A | | 4/1972 | Pierson |
| 4,851,687 A | | 7/1989 | Ettinger et al. |
| 8,771,480 B2 | | 7/2014 | Medoff |
| 2002/0131543 A1 | | 9/2002 | Leung |

(Continued)

FOREIGN PATENT DOCUMENTS

| | | |
|---|---|---|
| EP | 0436990 A2 | 7/1991 |
| WO | 2009148648 | 12/2009 |

(Continued)

OTHER PUBLICATIONS

International Search Report and Written Opinion issued in corresponding PCT application No. PCT/US2015/060829, dated Aug. 16, 2016, 15 pgs.

(Continued)

*Primary Examiner* — Sharon M Davis
(74) *Attorney, Agent, or Firm* — Chamberlain Hrdlicka (57) ABSTRACT

An accelerator neutron source (ANS) including a field ionization (FI) array configured to generate deuterium and tritium ions and a plasma for containing the deuterium and tritium ions produced by the FI array. The ANS also includes a target comprising deuterium and tritium ions and the ANS is configured to accelerate deuterium and tritium ions produced by the FI array toward the target to generate neutrons by applying a voltage to an accelerating electrode.

7 Claims, 5 Drawing Sheets

(56) References Cited

U.S. PATENT DOCUMENTS

| | | | |
|---|---|---|---|
| 2009/0135982 A1* | 5/2009 | Groves | H05H 3/06 |
| | | | 376/113 |
| 2010/0232559 A1 | 9/2010 | Takeishi et al. | |
| 2011/0044418 A1 | 2/2011 | Stubbers et al. | |
| 2013/0168542 A1 | 7/2013 | Navarro-Sorroche | |
| 2014/0263993 A1* | 9/2014 | Perkins | G21G 4/02 |
| | | | 250/253 |

FOREIGN PATENT DOCUMENTS

| | | |
|---|---|---|
| WO | 20150102576 A1 | 7/2015 |
| WO | 20150102607 A1 | 7/2015 |

OTHER PUBLICATIONS

Verbeke, Jerome M., Development of high-intensity DD and DT Neutron Sources and Neutron filters for Medical and Industrial Applications.

\* cited by examiner

HIGH OUTPUT ACCELERATOR NEUTRON SOURCE

BACKGROUND

This section is intended to provide background information to facilitate a better understanding of the various aspects of the described embodiments. Accordingly, it should be understood that these statements are to be read in this light and not as admissions of prior art.

Since their introduction to the oil and gas industry, accelerator neutron sources have been and continue to be utilized in a number of applications. One such application is well logging, where neutron generators provide energetic neutrons that radiate into formations surrounding a borehole. Measurements of the neutron interaction with nuclei in the formations may be obtained and analyzed to determine properties of the formations.

BRIEF DESCRIPTION OF THE DRAWINGS

For a detailed description of the embodiments of the invention, reference will now be made to the accompanying drawings in which.

DETAILED DESCRIPTION

Figure 1A:
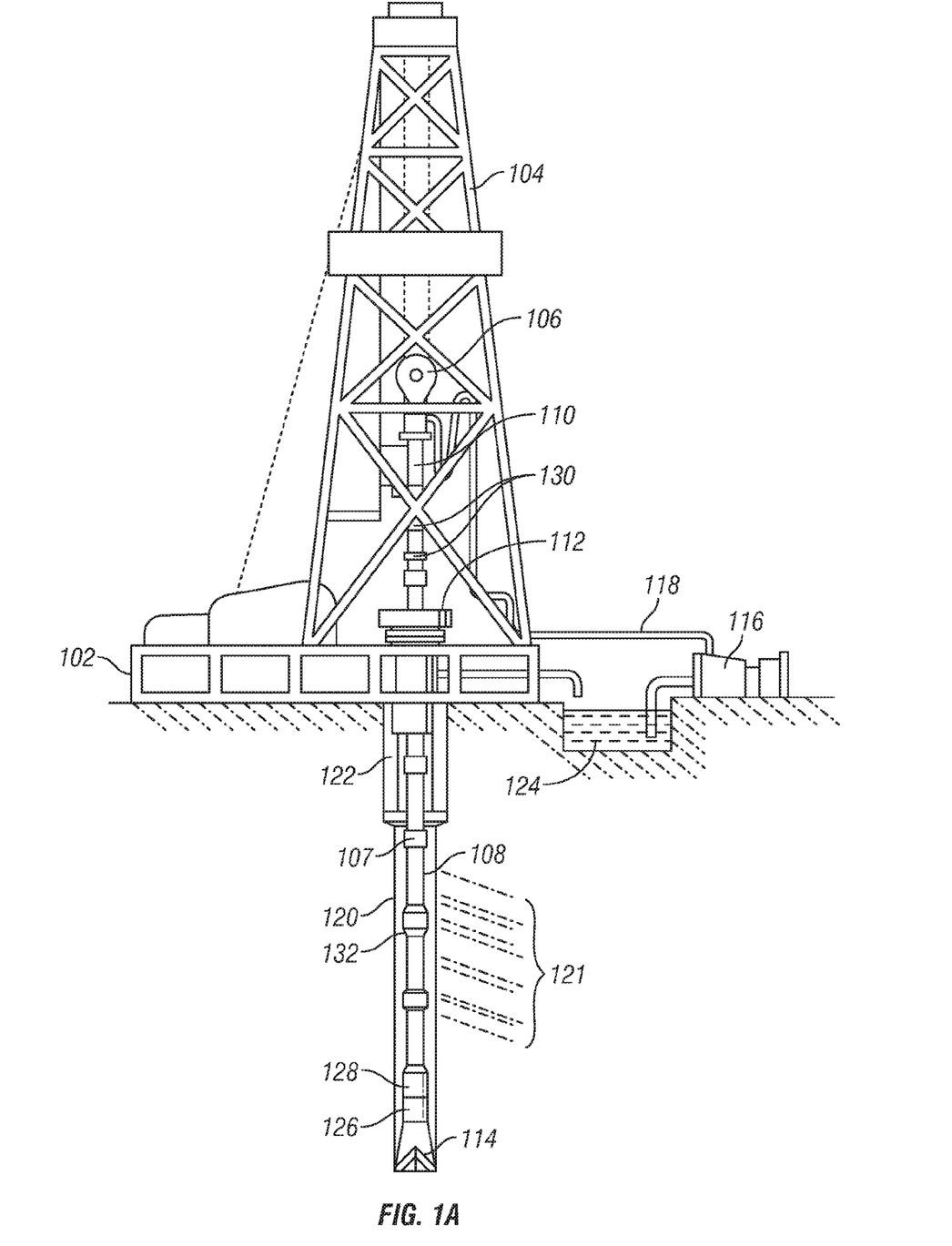
FIGS. 1A and 1B depict illustrative oilfield environments in accordance with one or more embodiments.

FIG. 1A depicts an example oilfield environment in accordance with one or more embodiments. A drilling platform 102 is equipped with a derrick 104 that supports a hoist 106 for raising and lowering a drill string 108. The hoist 106 suspends a top drive 110 that rotates the drill string 108 as the drill string is lowered through the well head 112. Sections of the drill string 108 are connected by threaded connectors 107. Connected to the lower end of the drill string 108 is a drill bit 114. As bit 114 rotates, a borehole 120 is created that passes through various formations 121 within a reservoir.

As shown, casing 122 is installed within the borehole 120 and extends at least partially along a length of the borehole 120. In one or more embodiments, multiple casings may be located within the borehole 120 and one or more casings may extend within a portion of or the entirety of another casing, such as casing 122. A pump 116 circulates drilling fluid through a supply pipe 118 to top drive 110, through the interior of drill string 108, through orifices in drill bit 114, back to the surface via the annulus around drill string 108, and into a retention pit 124. The drilling fluid transports cuttings from the borehole 120 into the pit 124 and aids in maintaining the integrity of the borehole 120.

Downhole sensors (including tool 126) are coupled to a telemetry module 128 having a transmitter (e.g., acoustic telemetry transmitter) that transmits signals in the form of acoustic vibrations in the tubing wall of drill string 108. A receiver array 130 may be coupled to tubing below the top drive 110 to receive transmitted signals. One or more repeater modules 132 may be optionally provided along the drill string to receive and retransmit the telemetry signals. Of course, other telemetry techniques can be employed including mud pulse telemetry, electromagnetic telemetry, and wired drill pipe telemetry. Many telemetry techniques also offer the ability to transfer commands from the surface to the tool, thereby enabling adjustment of tool configuration and operating parameters. In some embodiments, the telemetry module 128 also or alternatively stores measurements for later retrieval when the tool 126 returns to the surface.

In one or more embodiments, the tool 126 may be integrated into the bottom-hole assembly near the bit 114. The tool 126 may take the form of a drill collar, i.e., a thick-walled tubular that provides weight and rigidity to aid the drilling process. As the bit extends the borehole 120 through the formations 121, the tool 126 collects measurements of the borehole 120, casing 122 and any annuluses surrounding casing 122, and formations 121 around the tool 126, as well as measurements of the tool orientation and position, drilling fluid properties, and various other drilling conditions. In one or more embodiments, the tool 126 may be a neutron generator, a logging tool, an induction tool, a density tool, or any other tool or combination of tools known to those of skill in the art.

After obtaining measurements, the tool 126 or facility (such as logging facility 144 in FIG. 1B) may analyze the measurements of the borehole 120 and formations 121 around the tool 126 in order to determine one or more formation properties.

Figure 1B:
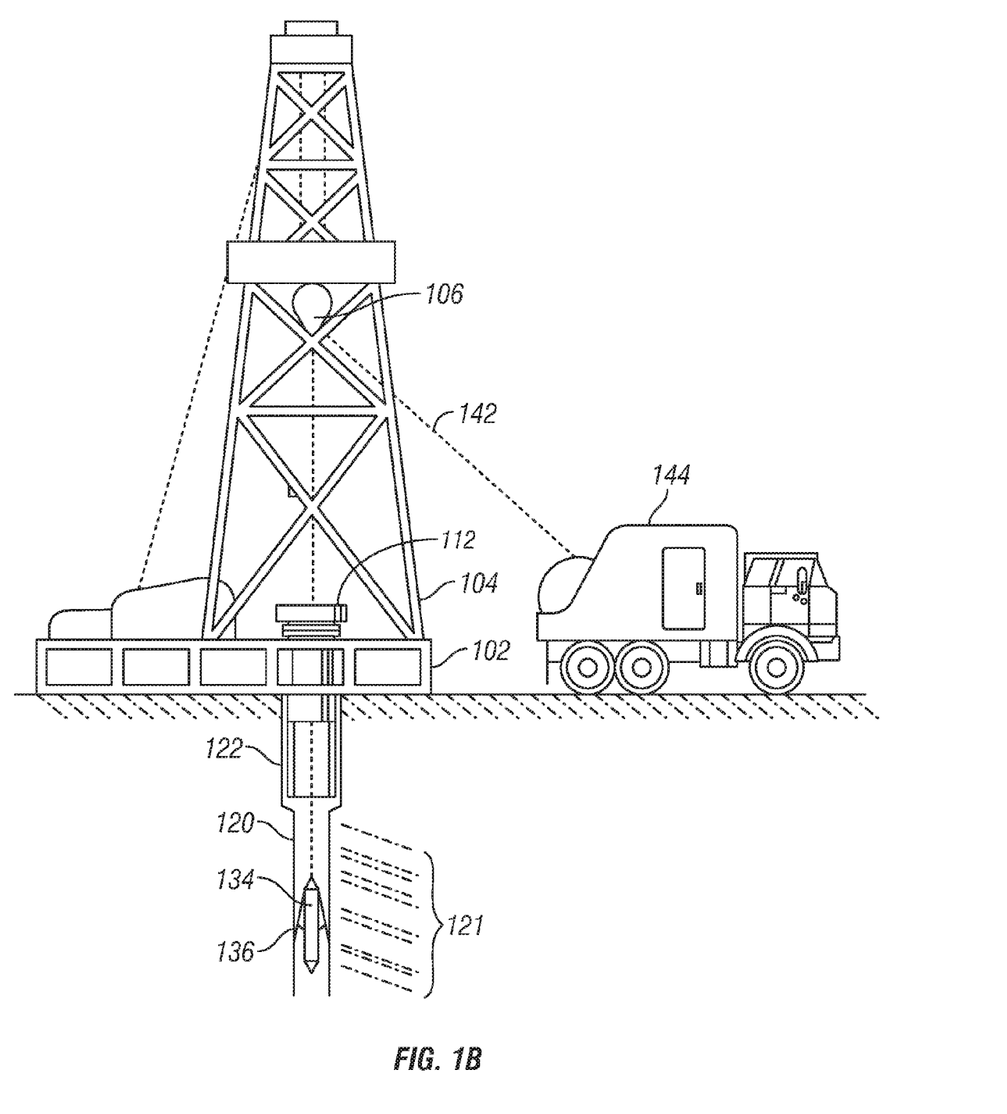

At various times during the drilling process, the tool 126 may perform logging or measurement operations as a so-called logging-while-drilling ("LWD") or measurement-while-drilling ("MWD") tool. At other times, the drill string 108 may be removed from the borehole and logging operations may be conducted as shown in FIG. 1B, where a logging tool 134 is suspended by a cable 142 (e.g., a slickline, a wireline, a braided cable etc.). While a cable is shown, it should be understood that logging tool 134 could be conveyed into the borehole 120 with other types of conveyance such as coiled tubing, a downhole tractor, rigid pipe (e.g., jointed tubulars), or the like. The cable 142 may include conductors for transporting power to the tool 134 and telemetry from the tool 134 to the surface. Centralizers may be used to center or position the tool 134 in the borehole 120. Centralizers may include collars, rings, housings, or other centralizing devices, such as centralizing arms 136, as shown. A logging facility 144 may control the logging tool 134 collect measurements from the logging tool 134, and includes computing facilities for processing and storing the measurements gathered by the logging tool 134.

Figure 2A:
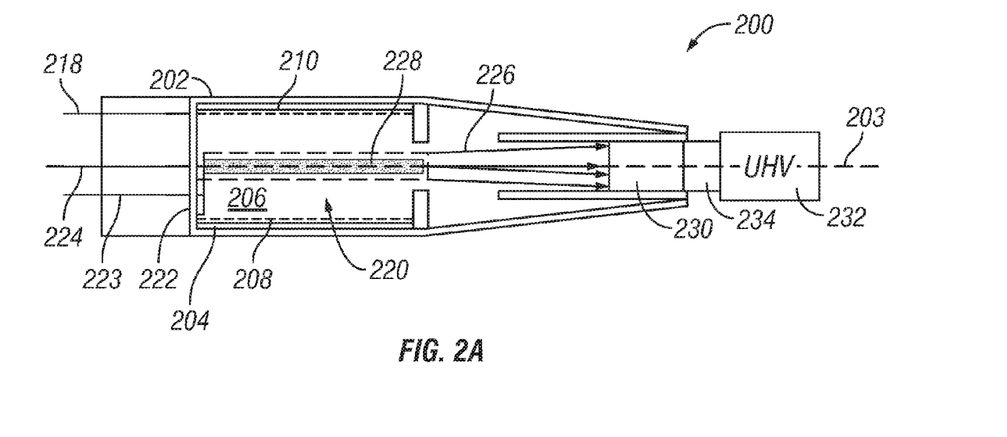
FIGS. 2A-2C depict schematic diagrams of an accelerator neutron source in accordance with one or more embodiments.
Figure 2B:
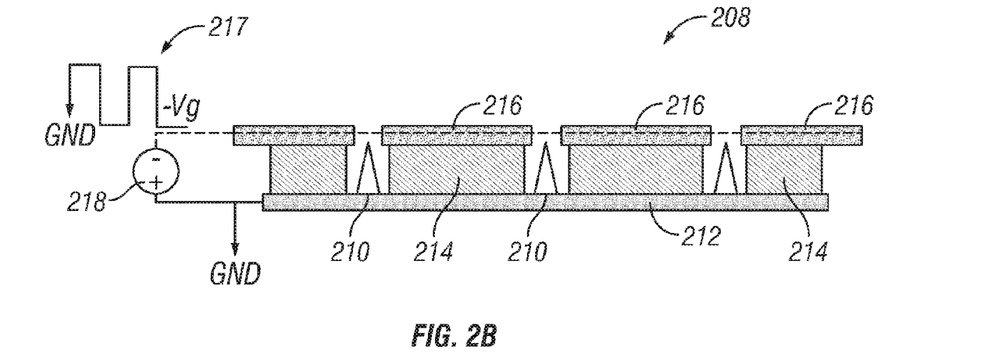
Figure 2C:
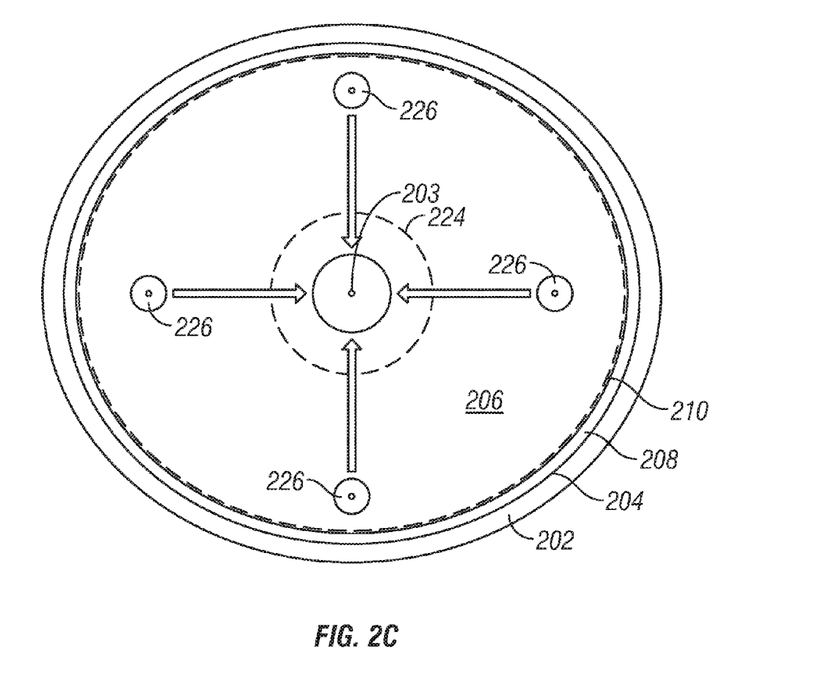

FIGS. 2A-2C depict schematic diagrams of an accelerator neutron source (ANS) 200 in accordance with one or more embodiments. As shown, ANS 200 includes a housing 202 having an inner surface 204 and a cavity 206 formed therein. The housing 202 may be cylindrically shaped and centered about central axis 203. The ANS 200 and housing 202 may be designed to fit within a standard 1.69 inch outer diameter pressure vessel, as used in the oil and gas industry. It should be understood that the ANS 200 and housing 202 may be any other symmetrical shape known in the art, such as rectangular, triangular, circular, spherical, etc., and may be used in other industries.

The ANS 200 includes a field ionization (FI) array 208 that generates deuterium ions (D+) and tritium ions (T+) for a neutron producing fusion reaction. The FI array 208, depicted separately in FIG. 2B, may include a plurality of nanotips 210. The nanotips 210 may be located about the inner surface 204 of housing 202 and directed toward the central axis 203. In one or more embodiments, the nanotips 210 of FI array 208 may be spaced apart and positioned about a substrate 212 to form an array of nanotips 210. The nanotips 210 may be mechanically attached to or integral with the substrate 212. As shown, nanotips 210 are separated from each other by insulators 214 and gate electrodes 216. The insulators 214 are used to electrically and mechanically separate gate electrodes 216 from the substrate 212. The insulators 214 may be formed from any insulating material known in the art, such as sintered glass, among others.

In one or more embodiments, one or more of the nanotips 210 may be made of tungsten, molybdenum, carbon, silicon, or combinations thereof and may be grown on the substrate 212. The substrate 212 may be formed from a nickel or silicon based material as known in the art. In one example, nanotips 210 may form an array of nanotips 210 located on substrate 212 and may be positioned about inner surface 204 of ANS 200 such that the nanotips 210 are directed toward the central axis 203 of the ANS 200. For example, the nanotips 210 may be cylindrically located about the inner surface 204 of housing 202. In another example, the nanotips 210 may be formed in several strips that are attached to the substrate 212 and/or to the inner surface 204 of housing 202 such that the strip is parallel with central axis 203. In this example, the nanotips 210 may also extend toward the central axis 203 of the housing 202.

The FI array 208 may include an ionization source 218 connected to the electrode gates 216 and substrate 212 and configured to apply a voltage between the gate electrodes 216 and the substrate 212. The spacing between nanotips 210 and gate electrodes 216 may be selected such that pulses 217 of ionization voltage from the ionization source 218 generates ions from an ionizable gas mixture 220 located within cavity 206. The ionizable gas 220 may include a mixture of deuterium (D) and tritium (T) atoms at an adjustable vacuum pressure or may be any other ionizable gas known in the art, such as Helium, Argon, and Nitrogen, among others. The ionizable gas 220 may be dispersed into cavity 206 of ANS 200 using gas reservoir 222 controlled by gas reservoir electrode 223 such that D and T atoms are dispersed around nanotips 210.

Field ionization is also considered field emission with reversed polarity, as the principles governing field emission applies to field ionization with the polarity of the electric field reversed. Field emission occurs when an electron from a metal tunnels through the potential barrier between the surface of the metal and the vacuum. In reverse, by applying a voltage across electrode gates 216 and substrate 212, substrate 212 becomes electrically positive with respect to gate electrode 216 and electrons from D and T atoms of the ionizable gas mixture 220 may tunnel through the potential barrier from the distorted atomic potential well, between the surface of the nanotips 210 and the ionizable gas 220 to generate D+ and T+ ions.

In one or more embodiments, D+ and T+ ions generated using FI array 208 may be accelerated toward the center of cavity 206, e.g., toward central axis 203 of ANS 200, by an accelerating field created by applying a voltage to accelerating electrode 224. To illustrate, a cross-sectional view of accelerated D+/T+ ions 226 within cavity 206 is depicted in FIG. 2C. As shown, D+/T+ ions 226 are directed toward the center of the cavity 206, e.g., toward central axis 203 using the accelerating field created by applying a voltage to accelerating electrode 224.

After accelerating toward the central axis 203, the D+/T+ ions 226 form plasma 228 located approximately around the central axis 203. The D+/T+ ions 226 may then be extracted and accelerated toward a neutron producing target 230 by applying an ultra-high voltage (UHV) 232 to the target 230. In one example, the UHV may be about −110 kV.

The target 230 may comprise titanium or a layer of titanium containing D+ and T+ ions deposited onto a target rod 234. The target rod 234 be a metal electrode (made of copper, for example) and may be connected to the UHV 232. D+ and T+ ions extracted from the plasma 228 collide with D+ and T+ ions of the target 230 to produce neutrons with an energy of about 14.1 MeV that are ejected into the subterranean formation surrounding the ANS 200 (such as formations 121 in FIG. 1A).

Nuclei of atoms in the subterranean formation may absorb one or more neutrons generated by the ANS 200 which produces an isotope of the atom in an excited state. The isotope de-excites through the emission of a gamma ray, which may be captured and used in techniques known in the art (e.g., a pulsed neutron capture log, elemental capture spectroscopy, and thermal neutron porosity measurements, among others). Data obtained using these techniques may then be used to determine one or more properties (e.g., porosity, density, and salinity, as well as geologic characteristics such as structural lithology and heterogeneities) of the subterranean formation.

Figure 3:
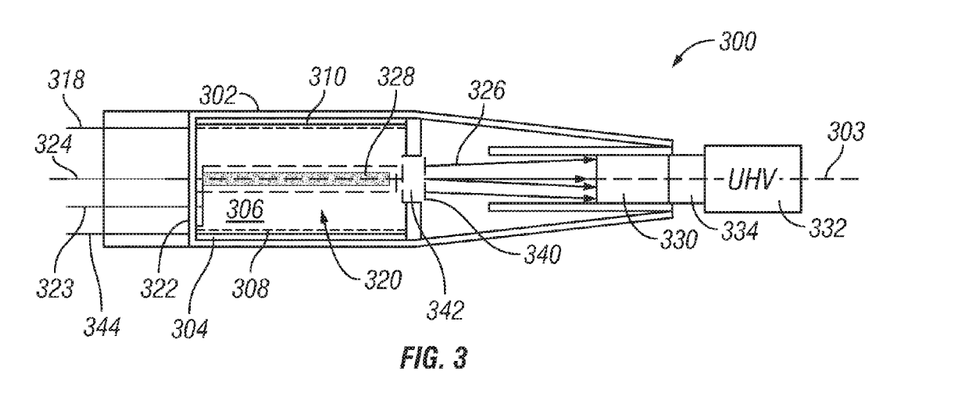
FIG. 3 depicts a schematic diagram of an accelerator neutron source in accordance with one or more embodiments.

FIG. 3 depicts a schematic diagram of an ANS 300 in accordance with one or more embodiments. Similar to above, ANS 300 includes a housing 302 having an inner surface 304 and a cavity 306 formed therein. The housing 302 may be cylindrically shaped and centered about central axis 303.

The ANS 300 also includes a FI array 308 having a plurality of nanotips 310. The nanotips 310 may be located about the inner surface 304 of housing 302 and directed toward the central axis 303. In one or more embodiments, the nanotips 310 of FI array 308 may be spaced apart and positioned about a substrate inner surface 304 and directed toward the central axis 303 of the ANS 300.

The FI array 308 may include an ionization voltage source electrode 318 configured to apply a pulsed voltage to generates ions from an ionizable gas mixture 320 located within cavity 306. The ionizable gas 320 may include a mixture of deuterium (D) and tritium (T) atoms at an adjustable vacuum pressure. The ionizable gas 320 may be dispersed into cavity 306 of ANS 300 using gas header 322 controlled by gas header electrode 323 such that D and T atoms are dispersed around nanotips 310.

The D+ and T+ ions may be accelerated toward the central axis 303 of ANS 300 using an accelerating grid created by applying a voltage to accelerating electrode 324. After accelerating toward the central axis 303, the D+/T+ ions 326 form plasma 328 located approximately around the central axis 303. In one or more embodiments, an extraction ring 340 forming an extraction aperture 342 may be used to extract the D+/T+ ions 326 from plasma 328. The extraction ring 340 may be positioned at least partially about the inner surface 304 of the housing 302 and configured to form an aperture 342 through which D+/T+ ions 326 may pass.

In one or more embodiments, to further improve the controllability of the ANS 300, a voltage may be applied to an extraction electrode 344. Voltage pulses of a given amplitude and polarity may be applied to the extraction ring 340 using extraction electrode 344. Ions 326 from plasma 328 are then accelerated toward a neutron producing target 330 by applying an ultra-high voltage (UHV) 332 of approximately −110 kV to the target 330. The target 330 may include a target rod 334 and include a thin layer of D+ and T+ ions are implanted therein. The target 330 may comprise titanium or a titanium layer deposited onto target rod 334. D+ and T+ ions 326 extracted from the plasma 328 collide with D+ and T+ ions of the target 330 to produce neutrons that are ejected into the subterranean formation surrounding the ANS 300 (such as formations 121 in FIG. 1A).

Figure 4A:
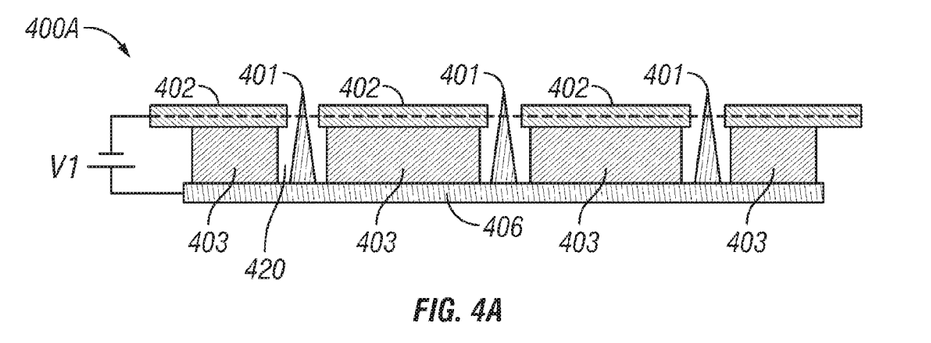
FIGS. 4A-4C depict examples of field ionization arrays for an accelerator neutron source in accordance with one or more embodiments.
Figure 4B:
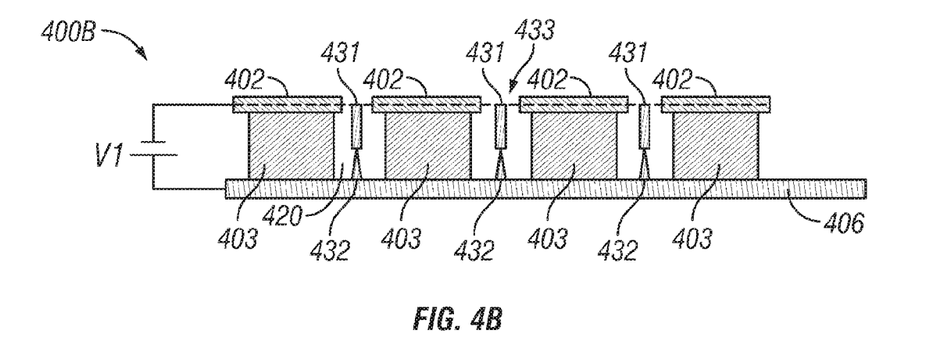
Figure 4C:
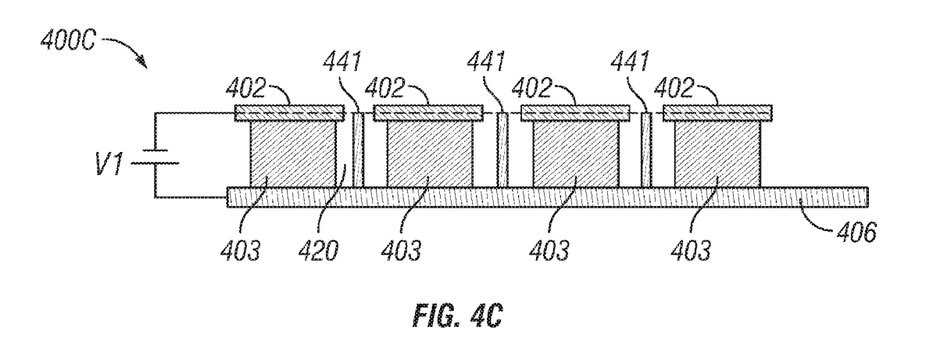

FIGS. 4A-4C depict examples of FI arrays that may be used with an ANS (e.g., ANS 200, ANS 300) in accordance with one or more embodiments. In FIG. 4A, a FI array 400A includes nanotips 401 spaced apart and position along substrate 406. Substrate 406 is electrically and mechanically separated from gate electrodes 402 using insulators 403. In this example, nanotips 401 are triangularly shaped and may made of tungsten, molybdenum, carbon, silicon, or combinations thereof. Similar to above, nanotips 401 may be grown on the substrate 406 and the substrate 406 may be formed from a nickel based material. Nanotips 401 may form an array of nanotips 401 located on substrate 406 and may be positioned about an inner surface of an ANS (e.g., ANS 200) such that the nanotips 401 are directed toward a central axis of the ANS.

In FIG. 4B, a FI array 400B includes nanotips 433 spaced apart and position along substrate 406. Substrate 406 is electrically and mechanically separated from gate electrodes 402 using insulators 403. In this example, nanotips 433 may comprise a tungsten base tip 432 attached to substrate 406 and a carbon nanotip 431 molecularly formed on an end of tungsten nanotip 432 using techniques known in the art. Nanotips 433 may form an array of nanotips 433 located on substrate 406 and may be positioned about an inner surface of an ANS (e.g., ANS 200) such that the nanotips 433 are directed toward a central axis of the ANS.

In FIG. 4C, a FI array 400C includes nanotips 441 spaced apart and position along substrate 406. Substrate 406 is electrically and mechanically separated from gate electrodes 402 using insulators 403. In this example, nanotips 441 may comprise a carbon nanotube attached to substrate 406. Nanotips 441 may form an array of nanotips 441 located on substrate 406 and may be positioned about an inner surface of an ANS (e.g., ANS 200) such that the nanotips 441 are directed toward a central axis of the ANS.

One or more embodiments provide an ANS including a FI array an associated voltage control for independent control of the extraction. Such an arrangement allows precise control of the amplitude and timing of the voltage pulses applied resulting in a better on-off time of the ANS and improvement of the transient characteristics of the ANS. Together with the accelerating electrodes, one or more embodiments provides an extraction grid electrode that allows the precise controlling of the ANS operation improving neutron output and overall reliability of the ANS.

In accordance with one or more embodiments, an ANS may include a pulsed neutron source with a turn-on/off time lower than 1 μs and provide for a high output (~$10^9$ n/s) source of energetic (14.1 MeV) neutrons. Additionally, with separate electrodes for the switching of the FI array and the switching of the accelerating and extraction ring, performance and controllability of the ANS may be improved.

In addition to the embodiments described above, many examples of specific combinations are within the scope of the disclosure, some of which are detailed below:

Example 1

An accelerator neutron source (ANS), the ANS comprising a field ionization (FI) array configured to generate deuterium and tritium ions, a plasma for containing the deuterium and tritium ions produced by the FI array, a target comprising deuterium and tritium ions, and wherein the ANS is configured to accelerate deuterium and tritium ions produced by the FI array toward the target to generate neutrons by applying a voltage to an accelerating electrode.

Example 2

The ANS of Example 1, wherein the FI array comprises a plurality of nanotips positioned about a substrate, the plurality of nanotips extending toward a central axis of a housing of the ANS.

Example 3

The ANS of Example 1, wherein the ANS is configured to provide about 109 neutrons per second, each neutron having an energy of about 14.1 MeV.

Example 4

The ANS of Example 1, wherein a turn-on/off time of the ANS is less than 1 μs.

Example 5

The ANS of Example 1, wherein the FI array further comprises an ionization source separate from the accelerating electrode and configured to apply a voltage between the substrate and the gate electrodes to produce deuterium and tritium ions.

Example 6

The ANS of Example 1, further comprising an extraction ring configured to extract deuterium and tritium ions from the plasma.

Example 7

The ANS of Example 6, wherein the extraction ring is connected to an extraction electrode separate from the accelerating electrode and an ionization source and configured to control the extraction of deuterium and tritium ions from the plasma.

Example 8

The ANS of Example 1, further comprising an ultra-high voltage source of about 110 kV connected to the target and configured to accelerate deuterium and tritium ions from the plasma toward the target.

Example 9

The ANS of Example 1, wherein the FI array is positioned about an inner surface of a housing of the ANS.

Example 10

The ANS of Example 9, wherein the nanotips of the FI array are positioned cylindrically about the inner surface of housing.

Example 11

A method of producing neutrons, comprising generating deuterium and tritium ions using a field ionization (FI) array, accelerating the generated deuterium and tritium ions toward a plasma using an accelerating grid, extracting the generated deuterium and tritium ions from the plasma, and producing neutrons by colliding the extracted deuterium and tritium ions with a target comprising deuterium and tritium ions.

Example 12

The method of Example 11, wherein producing neutrons comprises accelerating deuterium and tritium ions extracted from the plasma toward the target to produce neutrons with energy of about 14.1 MeV.

Example 13

The method of Example 11, wherein generating deuterium and tritium ions comprises applying a voltage across electrode gates and a substrate of the FI array using an ionization source separate from an accelerating electrode used to generate the accelerating grid.

Example 14

The method of Example 13, wherein generating deuterium and tritium ions further comprises tunneling an electron from a deuterium or a tritium atom in a gas to a nanotip of the FI array.

Example 15

A system for logging a well, the system comprising an accelerator neutron source (ANS), and a cable configured to couple the ANS and the logging facility, the ANS comprising a field ionization (FI) array configured to generate deuterium and tritium ions, a plasma comprising deuterium and tritium ions produced by the FI array, a target comprising deuterium and tritium ions, and wherein the ANS is configured to accelerate deuterium and tritium ions produced by the FI array toward the target to generate neutrons by applying a voltage to an accelerating electrode.

Example 16

The system of Example 15, wherein the FI array comprises a plurality of nanotips positioned about a substrate, the nanotips extending toward a central axis of a housing of the ANS.

Example 17

The system of Example 15, wherein the ANS is configured to obtain measurements of a subterranean formation surrounding the ANS.

Example 18

The system of Example 17, wherein properties of the subterranean formation are determined using measurements obtained by the ANS.

Example 19

The system of Example 18, wherein the properties of the subterranean formation comprise resistivity, porosity, density, and salinity, structural lithology, and heterogeneities.

Example 20

The system of Example 15, wherein the ANS further comprises an extraction ring configured to extract deuterium and tritium ions from the plasma, the extraction ring connected to an extraction electrode separate from the accelerating electrode and configured to control the extraction of deuterium and tritium ions from the plasma.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. An accelerator neutron source (ANS), the ANS comprising:
 a cylindrical housing comprising a cavity containing a gas comprising deuterium and tritium;
 a field ionization (FI array) within the cavity and configured to generate deuterium and tritium ions from the gas;
 a target comprising implanted ions within the cavity, the target configured to receive the deuterium and tritium ions and generate neutrons; and
 a cylindrical grid accelerating electrode within the cavity, the accelerating electrode coaxial with the housing and configured to direct the deuterium and tritium ions to a central region of the cavity within the cylinder of the accelerating electrode and aligned with a central axis of the housing and the accelerating electrode and to eject the ions along the central axis toward the target.

2. The ANS of claim 1, wherein the FI array further comprises plurality of nanotips positioned about a substrate, the nanotips extending from an inner surface of the housing into the cavity.

3. The ANS of claim 2, wherein the nanotips of the FI array are positioned cylindrically about the inner surface of the housing.

4. The ANS of claim 1, wherein the FI array, the accelerating electrode, and the target are operably connected and configured to produce about $10^9$ neutrons per second.

5. The ANS of claim 1, wherein the FI array further comprises an ionization voltage source configured to apply a voltage to the electrodes of the FI array.

6. The ANS of claim 1, further comprising an extraction ring configured to extract deuterium and tritium ions from the central region of the cavity within the cylinder of the accelerating electrode.

7. The ANS of claim 1, further comprising an ultra-high voltage source of about 110 kV connected to the target and configured to accelerate the deuterium and tritium ions from the central region of the cavity within the cylinder of the accelerating electrode toward the target.

* * * * *